United States Patent [19]

Nyui et al.

[11] Patent Number: 5,087,179
[45] Date of Patent: Feb. 11, 1992

[54] FILTER ATTACHMENT FOR GEAR PUMP

[75] Inventors: Sachio Nyui; Tamotu Nakamura; Junzo Kawakami, all of Saitama, Japan

[73] Assignee: Kabushiki Kaisha Showa Seisakusho, Japan

[21] Appl. No.: 505,497

[22] Filed: Apr. 6, 1990

[30] Foreign Application Priority Data

Apr. 17, 1989 [JP] Japan .................. 1-44707[U]

[51] Int. Cl.$^5$ .................. F04C 2/18; F04C 15/00; B01D 35/30
[52] U.S. Cl. .................. 418/47; 210/232
[58] Field of Search .......... 418/47; 92/78; 210/232, 210/238; 184/6.24

[56] References Cited

U.S. PATENT DOCUMENTS

| | | | |
|---|---|---|---|
| 2,407,046 | 9/1946 | Vokes | 210/232 |
| 2,842,065 | 7/1958 | Lease | 418/47 |
| 2,865,301 | 12/1958 | Thomas | 418/47 |
| 3,151,071 | 9/1964 | Kasten | 210/232 |
| 3,312,177 | 4/1967 | Eckerle et al. | 418/47 |
| 3,367,497 | 2/1968 | Loock et al. | 210/232 |
| 3,522,884 | 8/1970 | Frost | 210/232 |
| 3,785,970 | 1/1974 | Hodgkins | 210/232 |
| 4,228,011 | 10/1980 | Cote, Jr. | 210/232 |

FOREIGN PATENT DOCUMENTS

| | | | |
|---|---|---|---|
| 547377 | 10/1957 | Canada | 418/47 |
| 549346 | 10/1956 | Italy | 210/232 |

Primary Examiner—John J. Vrablik
Attorney, Agent, or Firm—Howard L. Rose

[57] ABSTRACT

A filter for filtering working oil to be introduced into a gear pump is detachably mounted on the gear pump. The gear pump has a recess defined in an outer circumferential surface thereof. The filter is held in place by a filter holder. The filter holder has locking fingers engageable in the recess. The filter holder is detachably mounted on the gear pump with the locking fingers engaging in the recess.

5 Claims, 2 Drawing Sheets

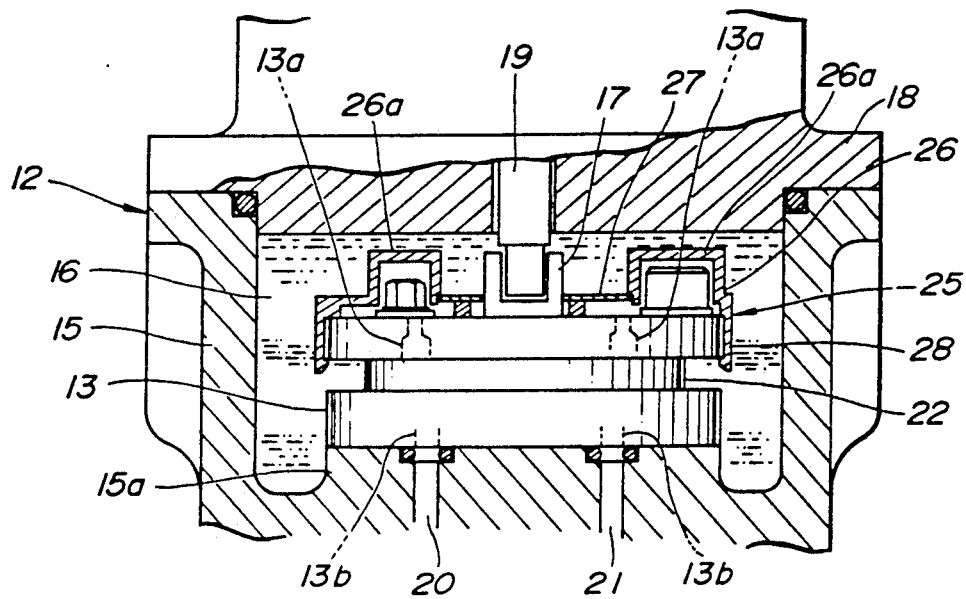
FIG. 2
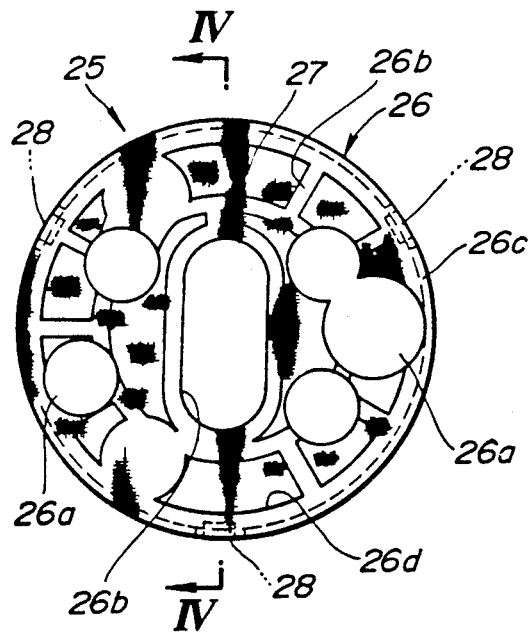
FIG. 3
FIG. 4

FILTER ATTACHMENT FOR GEAR PUMP

BACKGROUND OF THE INVENTION

1. Field of the Invention

The present invention relates to an attachment structure for a filter which filters working oil in a gear pump.

2. Description of the Relevant Art

Outboard engines for use as power units on small marine vessels such as motorboats are associated with tilt/trim units. The tilt/trim unit comprises a tilt cylinder for angularly moving the outboard engine through a relatively large angle to bring the lower part of the outboard engine into and out of water, and a trim cylinder for angularly moving the outboard engine vertically through a relatively small angle with the lower part of the outboard engine being immersed underwater. The tilt and trim cylinders are supplied with working oil under pressure by a gear pump. The gear pump has a filter disposed near the inlet port, for filtering the working oil.

Heretofore, the filter is held by a filter holder with dampers bonded to upper and lower surfaces of the filter holder. The filter unit, which is composed of the filter and the filter holder, is sandwiched, through the dampers, between the gear pump and the bracket of a motor which actuates the gear pump.

If a gear pump of a different displacement is employed, then the distance between the gear pump and the motor bracket is varied. Therefore, a filter unit which is to be held between the gear pump and the motor bracket must be of such dimensions as to suitably match the varied distance. Stated otherwise, there have to be available as many filter unit types as there are different gear pump displacements. As a consequence, it has been costly to manufacture the filter units. Bonding the dampers to the filter holder is tedious and time-consuming because care should be exercised to appropriately control the amount of an adhesive used. It is also not efficient and easy to attach or replace a filter as the filter holder thereof needs to be sandwiched between the gear pump and the motor bracket.

SUMMARY OF THE INVENTION

According to the present invention, a gear pump has a recess defined in an outer circumferential surface thereof, and a filter holder for holding a filter has locking fingers engageable in the recess of the gear pump. The filter unit can easily be mounted on the gear pump when the locking fingers of the filter holder engage in the recess of the gear pump. Since the filter unit is installed on the gear pump, the same filter unit can be employed even if the distance between the gear pump and a motor bracket which supports a motor for operating the gear pump is varied. After the filter unit is installed on the gear pump, the gear pump may be mounted in an oil tank which stores oil to be drawn into the gear pump. The filter unit can therefore be installed on the gear pump highly efficiently with utmost ease.

The above and further objects, details and advantages of the present invention will become apparent from the following detailed description of a preferred embodiment thereof, when read in conjunction with the accompanying drawings.

BRIEF DESCRIPTION OF THE DRAWINGS

FIG. 2 is an enlarged fragmentary cross-sectional view showing an oil tank of the tilt/trim unit;

FIG. 3 is a plan view of a filter unit; and

FIG. 4 is a cross-sectional view taken along line IV—IV of FIG. 3.

DETAILED DESCRIPTION OF THE PREFERRED EMBODIMENT

Figure 1:
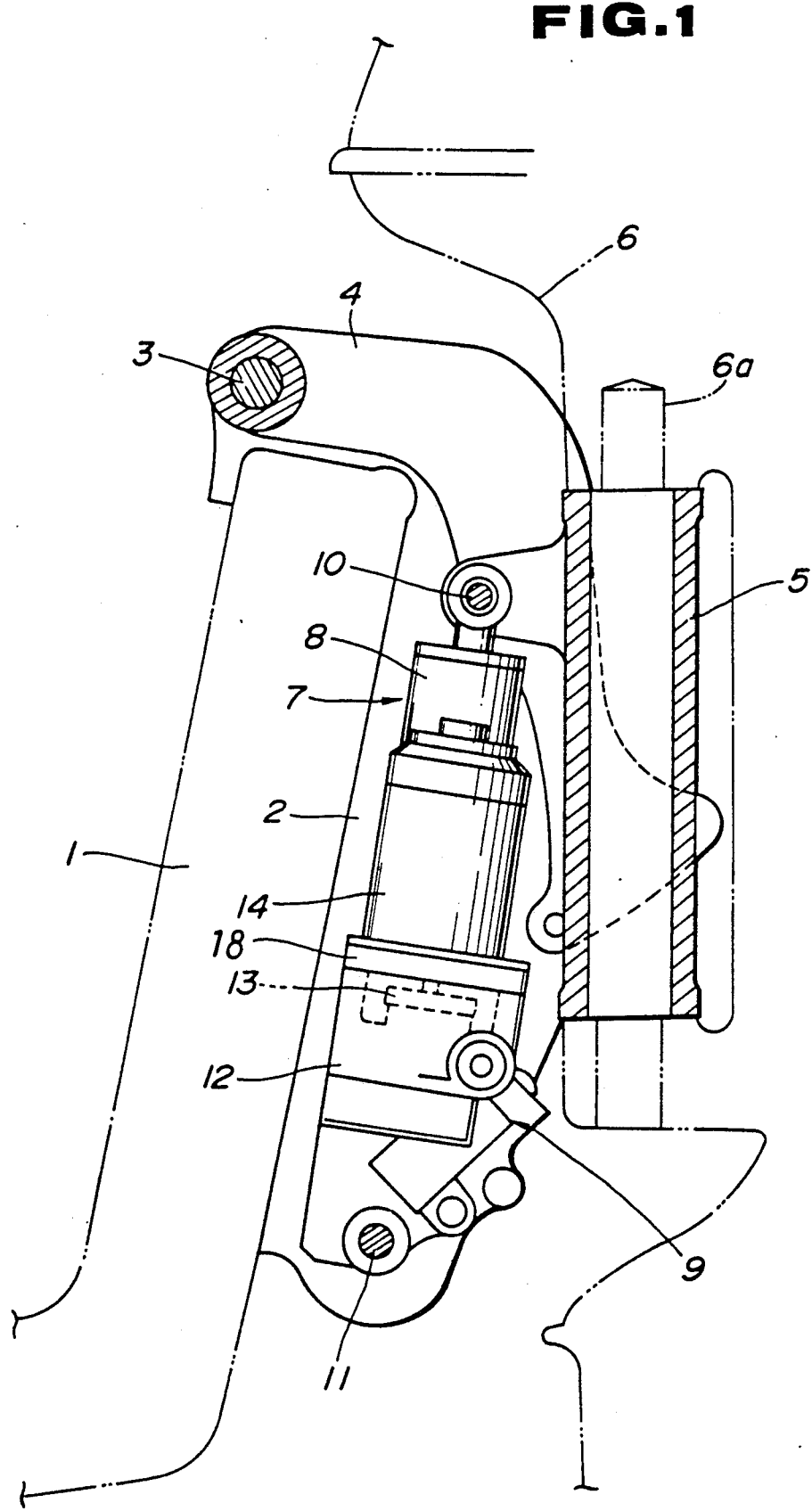
FIG. 1 is a side elevational view, partly in cross section, of an outboard engine associated with a tilt/trim unit incorporating a filter attachment structure according to the present invention.

As shown in FIG. 1, a pair of laterally spaced stern brackets 2 (one shown) is fixedly mounted on a stern board 1 by suitable fasteners. A horizontal pivot shaft 3 extends between and is supported by the stern brackets 2, and a swivel bracket 4 is vertically angularly movably supported on the pivot shaft 3. The swivel bracket 4 supports a support pipe 5 fixed to a central portion thereof. An outboard engine 6 has a vertical pivot shaft 6a extending through and rotatable in the support pipe 5. The outboard engine 6 is therefore vertically swingable about the pivot shaft 3 and horizontally swingable about the pivot shaft 6a.

A tilt/trim unit 7 is disposed in a space surrounded by the stern brackets 2 and the swivel bracket 4. The tilt/trim unit 7 serves to angularly move the outboard engine 6 through a relatively large angle to move the lower part of the outboard engine 6 upwardly and downwardly, and also to angularly move the outboard engine 6 vertically through a relatively small angle, with the lower part of the outboard engine 6 being immersed underwater.

The tilt/trim unit 7 comprises a cylinder unit 8 and a hydraulic pressure circuit for supplying working oil to the cylinder unit 8. The hydraulic unit has a valve mechanism 9, an oil tank 12 filled with working oil, a gear pump 13, and a motor 14 for actuating the gear pump 13.

The cylinder unit 8 includes a piston whose tip end is coupled to the swivel bracket 4 through a pin 10. The cylinder unit 8 has a lower portion coupled to the stern brackets 2 through a pin 11.

The oil tank 12 is disposed on one side of the cylinder unit 8, and the gear pump 13 is positioned in the oil tank 12. The motor 14 which is mounted on a motor bracket 18 is disposed upwardly of the gear pump 13.

As shown in FIG. 2, the oil tank 12 comprises a tank housing 15 and the motor bracket 18. The gear pump 13 is mounted on a support base 15a on the center of the bottom of the tank housing 15. The gear pump 13 has inlet ports 13a defined in an upper surface thereof which lies in the oil tank 12, and outlet ports 13b defined in a lower surface thereof, the outlet ports 13b communicating with oil passages 20, 21. The gear pump 13 has a drive joint 17 coupled to an output shaft 19 of the motor 14. When actuated by the motor 14, the gear pump 13 draws the working oil in the oil tank 12 through the inlet ports 13a and discharges the working oil from the outlet ports 13b.

The gear pump 13 has a recess 22 defined as an annular groove around the full outer circumferential surface thereof. The recess 22 may however be in the form of a plurality of interrupted grooves defined in the outer circumferential surface of the gear pump 13.

As illustrated in FIG. 2, a filter unit 25 is mounted on the gear pump 13a in covering relation to the upper surface thereof where the inlet ports 13a are defined. As shown in FIGS. 3 and 4, the filter unit 25 comprises a cap-shaped filter holder 26 and a filter 27 held by the filter holder 26. The filter holder 26 comprises a frame 26b having a plurality of openings 26d, and a short tubular rim 26c integral to and extending from the outer peripheral edge of the frame 26b. The filter 27 is mounted on the upper surface of the frame 26b in covering relation to the openings 26d. The frame 26b also has a plurality of upwardly extending, hollow protuberances 26a which accommodate projections, i.e., the heads of bolts on the upper surface of the gear pump 13, out of interference with the bolt heads. The filter unit 25 is therefore of a configuration which is substantially complementary to the shape of the upper portion, which includes the bolt heads and the upper surface, of the gear pump 13. The rim 26c has a plurality of locking fingers 28 which engage in the recess 22 of the gear pump 13.

The filter holder 26 is made of an elastically deformable resin or the like so that the locking fingers 28 can easily be brought into and out of locking engagement in the recess 22. The rim 26 has an inside diameter which is substantially the same as the outside diameter of the gear pump 13. Therefore, when the filter unit 25 is mounted on the gear pump 13, the filter unit 25 is stably and securely retained on the gear pump 13 without wobbling movement thereon.

In order to install the filter unit 25 on the gear pump 13, the rim 26c of the filter holder 26 is fitted over the upper portion of the gear pump 13 and forcibly pressed down until the locking fingers 28 snap into the recess 22 of the gear pump 13. For removal, the locking fingers 28 are forcibly pulled upwardly out of engagement with the upper edge of the recess 22, and the rim 26c is lifted off the gear pump 13. Consequently, the filter unit 25 can easily be mounted on and dismounted from the gear pump 13.

As described above, the filter unit 25 is mounted on the upper portion of the gear pump 13. Even if a gear pump 13 of a larger size is employed and the distance between the upper surface of the gear pump 13 and the lower surface of the motor bracket 18 is varied, the same filter unit 25 may be installed on the gear pump 13 insofar as the outside diameter of the gear pump 13 remains the same.

With the present invention, as described above, the filter unit can be mounted and retained on the gear pump when the locking fingers of the filter holder engage in the recess of the gear pump. Accordingly, the filter can easily be installed and replaced. As the filter unit is retained on the gear pump, a filter unit of the same type may be employed even if the distance between the gear pump and the motor bracket is varied. The filter holder of common configuration can thus be used with the gear pump. Since any spacers or dampers for holding the filter are not required, the number of parts required and the cost thereof are reduced.

Although there has been described what is at present considered to be the preferred embodiment of the present invention, it will be understood that the invention may be embodied in other specific forms without departing from the essential characteristics thereof. The present embodiment is therefore to be considered in all aspects as illustrative, and not restrictive. The scope of the invention is indicated by the appended claims rather than by the foregoing description.

We claim:

1. A filter unit for installing a filter on a gear pump having an outside diameter projections on a surface, comprising:
    a filter for filtering working oil to be introduced into the gear pump; and
    a filter holder for holding said filter in place, including;
    a frame having a plurality of openings and hollow protuberances accommodating the projections of the gear pump out of interference therewith, whereby said filter holder has a configuration substantially complementary to the shape of said projections and said surface of the gear pump, and
    a rim integral to said frame and having an inside diameter which is substantially the same as the outside diameter of the gear pump, said rim having locking fingers engageable in a recess defined in the gear pump said filter holder being detachably mounted on said gear pump with said locking fingers engaging in said recess.

2. A gear pump and filter combination comprising:
    a gear pump having an outside diameter a recess defined in an outer circumferential surface thereof and projections on a flat surface thereof;
    a filter for filtering working oil to be introduced into said gear pump; and
    a filter holder for holding said filter in place, including;
    a frame having a plurality of openings and hollow protuberances accommodating said projections out of interference therewith, whereby said filter holder has a configuration substantially complementary to the shape of said projections and said flat surface of said gear pump, and
    a rim integral to said frame and having an inside diameter which is substantially the same as the outside diameter of said gear pump, said rim having locking fingers engageable in said recess, said filter holder being detachably mounted on said gear pump with said locking fingers engaging in said recess.

3. A gear pump and filter combination according to claim 2 wherein said filter is mounted on said frame of the filter holder.

4. A gear pump and filter combination according to claim 2, wherein said recess in the outer circumferential surface of said gear pump comprises an annular groove extending fully around said outer circumferential surface of the gear pump.

5. A gear pump and filter combination according to claim 2, further including a tank of the working oil, said gear pump being disposed in said tank, said gear pump having an inlet port defined in said surface, said filter holder being mounted on said gear pump in covering relation to said surface of the gear pump.

* * * * *